7443X

S. Newton. Sheet 1. 3 Sheets.

Printing Press.

No.

Patented Feb. 26. 1833.

7443y

Sheet 2. 2 Sheets.

S. Newton.

Printing Press.

No.

Patented Feb. 26. 1833.

7443X
S. Newton. Sheet 3 3 Sheets.
Printing Press.
No. Patented Feb. 20. 1833.
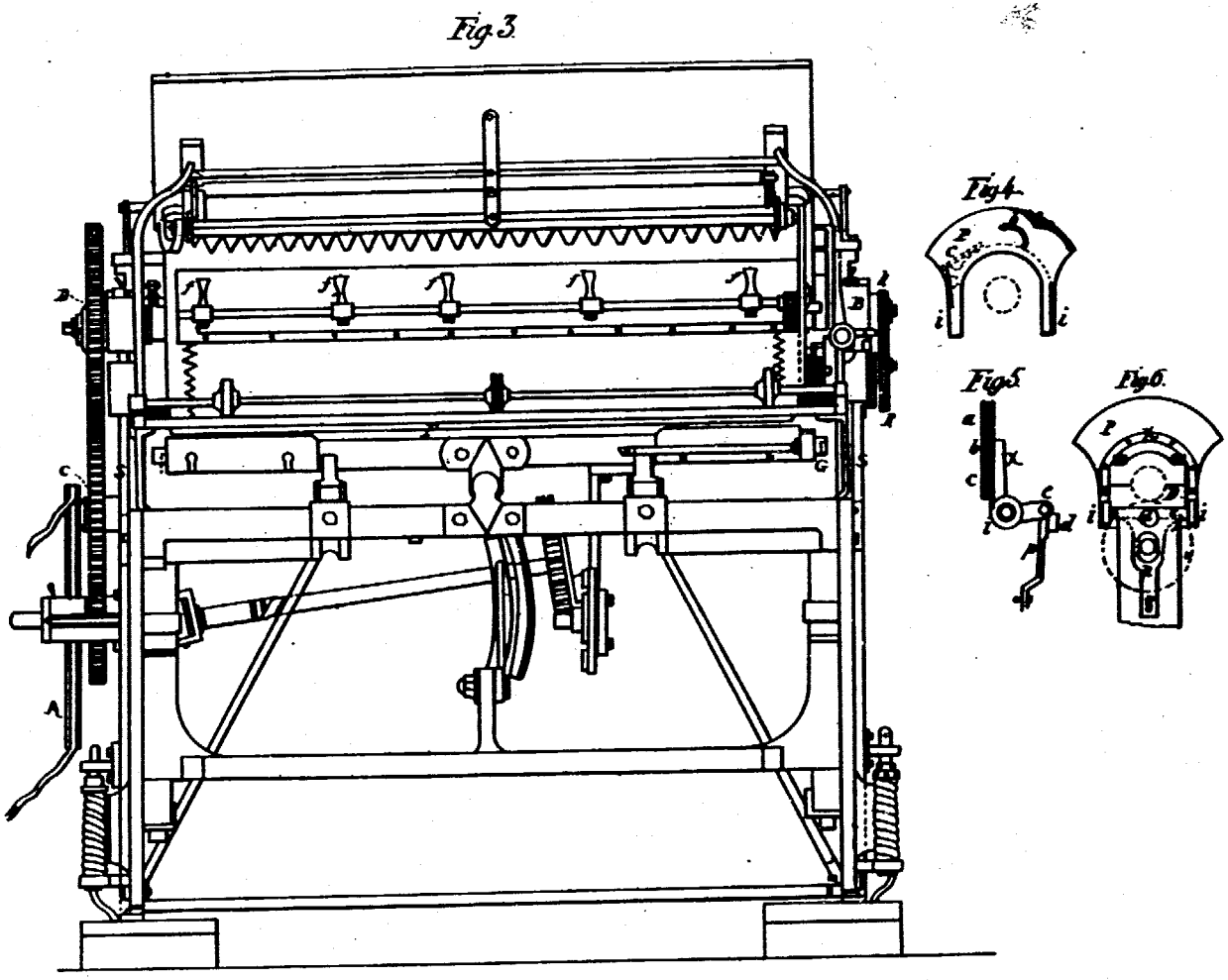

7443X 2/26/1833 [illegible]

Gerome Newton of New York City
Letters Patent

The Schedule referred to in these Letters Patent and making part of the same containing a description in the words of the said Gerome Newton himself of his improvement in the printing machine or press known as the Double Napier printing Machine.

Figure 1:
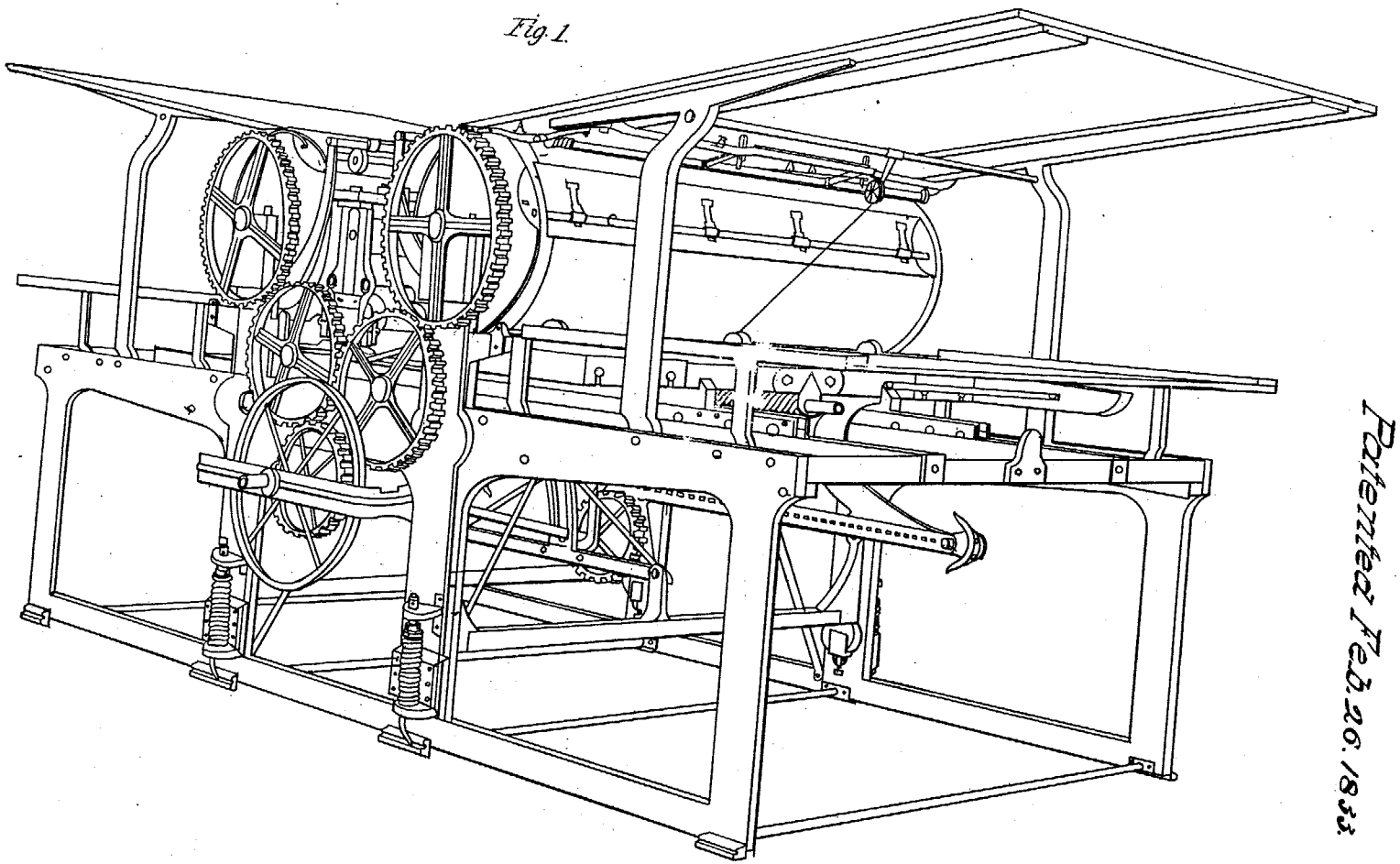
Figure 2:
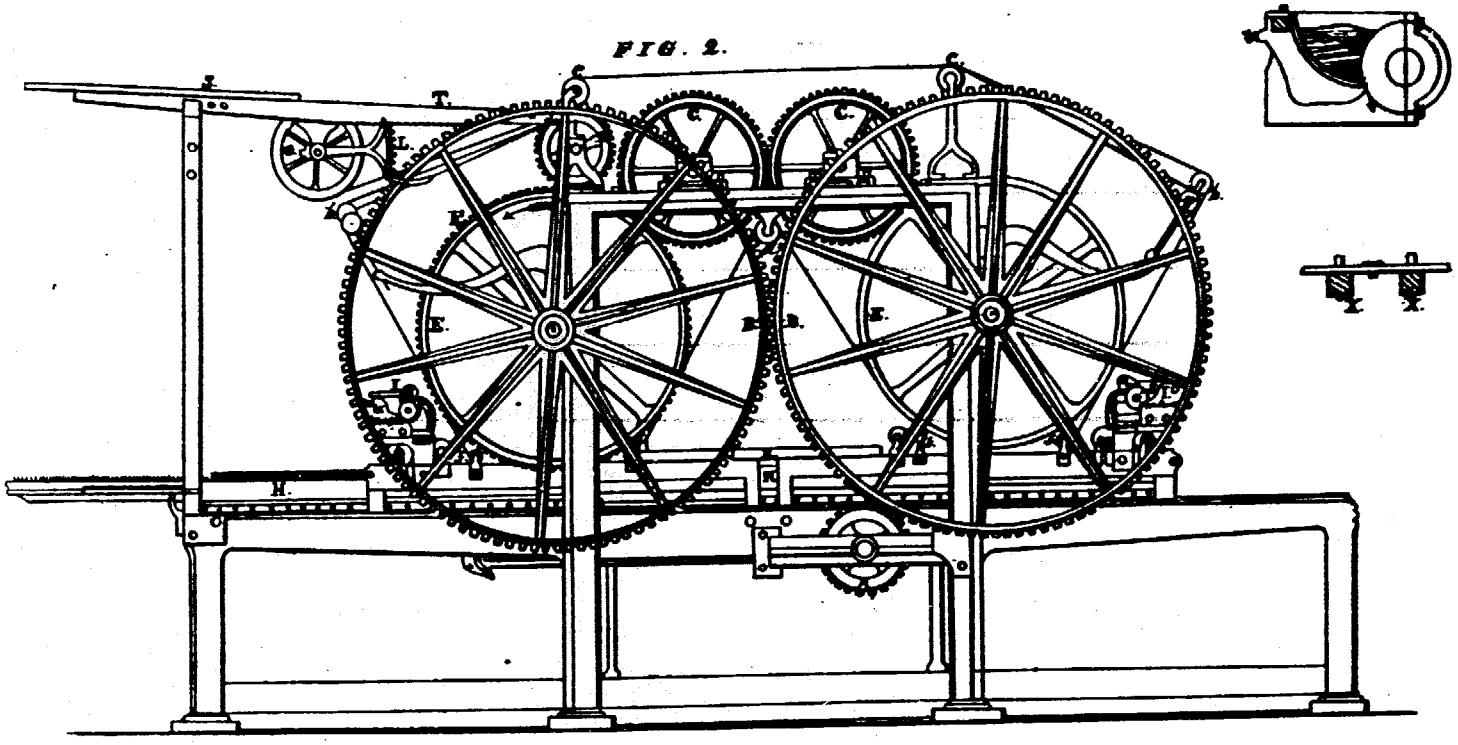

To all whom it may concern: Be it known that I Gerome Newton of the City of New York have invented certain improvements in the printing Machine or Press known as the double Napier Printing Machine invented by D. Napier of London in Great Britain which improvements are in part applicable to the single cylinder Machine, and I do hereby declare that the following is a full and exact description of the said machine with my improvements. Fig 1. Is a perspective view of the machine which being in its general principle the same with the Napier Press does not require to be particularly described in this. however A is the lever hereafter to be more particularly noticed. B a piece of iron to which the slides connected with the regulating apparatus are attached. C the gripper arbor with its pivots and the grippers below the surface of the cylinder. Fig 2 is a side view of the machine. A are the levers as in Fig 1. Fig 3 is an end view ffff are the grippers upon their arbor as noticed in fig 1. This machine has two cylinders each making an impression on the form at every third revolution and is in this respect, as well as in its general construction, the same in principle with the Napier Printing machine before alluded to, but it differs from this machine in the arrangement of that part used for seizing and transferring the sheets from the bank board to the form of type, by which they are printed and afterwards delivered in their proper places. It differs also in the addition of that part used for perfecting the sheets, and thus making register. For the purpose of taking the sheets from the bank board and retaining them against the face of the cylinder until they have passed between it and the type and afterwards releasing and delivering them in their proper
places. I attach to each cylinder the same kind of apparatus, or ma-
chinery as that used by the said Napier, in his well known single cylin-
der Printing Machine for that purpose. That is to say an iron rod
or bar which I have called the Gripper arbor. the grippers being
so fitted thereon that they may be secured by tightening screws on
any part required. Near one end of the gripper arbor there is a pin-
ion of about one inch and a quarter in diameter, fixed permanently
and this takes into a wheel which I call the gripper wheel, of about
four inches in diameter having on about one fifth of its circumference
teeth which correspond with those on the pinion
A roller of steel or of iron called the check roller made of the same
thickness as the gripper wheel is pressed into its face by a steel spring
and is thus made to fall into cavities formed on the periphery of the
wheel at suitable distances; thus serving the purpose of stopping
and retaining the grippers in their proper places. Near the periph-
ery of the above wheel and and parallel to its axis a pin with
a friction Roller on its end projecting an inch or more beyond
the end of the cylinder, this in the single cylinder machine at
every revolution of the cylinder comes in contact with segments
or pieces of iron of suitable form fastened permanently near the
end of the cylinder, and these by acting on the above named friction
Rollers attached to the gripper wheel, causes the grippers to close and
open at every revolution of the cylinder. But in order to adapt
these to my machine, a concavity is formed on one side of the cylinder
of sufficient depth to admit the gripper arbor and its appendages
to be sunk below the face of the cylinder, so as to pass clear of the
type on the bed as the form passes under the cylinder, and also to
allow the grippers with their arbor, to make nearly half a revolu-
tion back from the position in which they hold the sheet to the
cylinder. The concavity terminates at a little distance from one
end of the cylinder so as to leave a cheek to receive the pivot of
one end of the gripper arbor. the other end, on which the pin-iron is fastened having its bearing and turning in the arm of a wheel
which is fitted to the end of the cylinder shaft and which is also
secured by screws against the end of the cylinder, they being of equal
diameter. one of the pivots of the gripper wheel is fitted to and
turns in one of the arms of this Wheel & the other in one of the
arms of the cylinder which standing about two inches within its end
leaves a suitable space for that purpose. The check roller and the spring
are also attached to the above named wheel. To cause the grippers
to act at every third revolution of the cylinder only I attach the
segments a b & c figures 4 & 5. to a plate of iron P of about one
fourth of an inch thick — which is permanently fastened to the piece
of iron X figs 5 & 6. This piece of iron turns upon a bolt or
pins at i i and consequently allowing the plate P. to move back-
ward and forward. The piece of iron p. figs 5 & 6. is fitted to and
turns on a joint in the piece X. at e l. There is a groove or
slot in the lower end of the piece p. thro' which a screw passes
into the slide S. in which it is tightened whilst a sufficient
space is left between the head of the screw and the slide to allow
the piece p to move freely up and down. To this piece p is
attached the friction roller d figs 5 & 6. which works in an eccen
tric groove represented by the dotted lines in the wheel R fig. 2.
this wheel is drawn by a pinion h. fastened on the end of the cylin-
der shaft and having on it but one third of the number of teeth which
there are upon the wheel R. The part y of the groove must be such
portion of a circle as will, by its action on the friction Roller keep the
plate P in a perpendicular position whilst the cylinder is making
about five sixths of a revolution, or for such a period as is required
between the commencement of the action of the segments on the grippers
until it has opened them, when the top of the plate P. to which the
segment a b c are attached, falls back into a horizontal position
in order that they may not act on the grippers again until the third
revolution of the cylinder, when it is again brought to a perpendicu
lar position. The tapes or cords are conducted by rollers & pulleys.

1443X and are tightened by weights as in the single cylinder machine. For
the purpose of perfecting the sheets and making register in Book
work, I attach a piece of sheet iron or steel to one end of each cyl-
inder. these pieces may be about one sixteenth of an inch thick.
these are let in even with the face of and screwed firmly to the cyl-
inder their edges projecting about half an inch over its ends. & exten-
ding about two thirds of the way round the cylinder. commencing about
two inches back from the gripper arbors. To that end of the gripper ar-
bor opposite to that on which the pinion is fastened. I also attach a
smaller roller set off about three fourths of an inch from and parallel
with the centre of the arbor. this roller is also set nearly half an inch
clear of the end of the cylinder. At a suitable distance back of each
cylinder and parallel therewith I place a piece of Iron as represented
at B in fig 1. These pieces are attached by screws at each end to
the beams or pieces that support the bank board to these pieces are
fitted slides perpendicular to the face of the bank Board. they may
be from twelve to fifteen inches apart and at equal distances from
each end to these slides are fitted pieces of metal of such form as may
be deemed most convenient for setting and fastening the points which
are so attached as to project up through the bank board.
Between the above slides and the cylinders at a distance of from
four to six inches from the slides. there is a rod of iron which turns free-
ly on its journals; to this rod two arms are fastened which extend
back as far as the above slides and are connected by a link to the
pieces fitted to the slides. and one end of this rod is fastened a lever
shown at A in figs. 1 & 2. the end of which is lifted by the eccentric
or roller on the end of the gripper arbor, whenever the grippers close
and is kept up in this place for the proper time by a small roller
fitted to the side of the lever which is next to the cylinder and which
bears on the sheet of steel or iron placed upon and projecting from
the end of the cylinder. In the operation of Printing there are small
steel points fastened to the cloth on the face of the cylinders. and
the end of the lever is raised so as not to be acted upon by the eccen- 1443X [illegible]

tric on the end of the gripper arbor. The sheet of paper is laid on the
points board with the edge a little over the centre of the cylinder and
at the proper time the grippers catch the sheet and conduct it be-
tween the tapes and the cylinder, the tapes forcing the points thro' the
paper which is carried between the cylinder and form and printed on
one side. When the second side is to be printed the lever is let down
and the sheet put on the points projecting through the board which
[illegible] as to correspond with the holes made in the sheets by the
points on the face of the cylinder and at the moment the grippers
catch the sheet the points are withdrawn from it by the operation of
the eccentric fixed upon the end of the gripper arbor which acting
on the before described lever raises the end of it until the roller attach-
ed to the side of it bears on the projecting sheet iron or steel on the
end of the cylinder. When the bearing roller runs off from the end
of the sheet metal the lever is brought down by the action of a spiral
spring attached to the end on which the lever is fixed. during the
next two revolutions of the cylinder, the projecting sheet metal on
the end of the cylinder passes over the roller on the side of the lever.

What I claim as new and for which I ask a Patent. in the ma-
chinery herein described is the application of the above described grippers
to a printing machine, the cylinders of which make three revolutions
to one impression, whether the apparatus by which they are acted upon
is constructed exactly in the manner described, or in any other ope-
rating upon the same principle and producing a similar result

I also claim the particular mode herein described of with-
drawing the apparatus which acts upon the grippers, not only to cyl-
inders making three but also to those making only two revolutions
to each impression. I also claim the application of the eccen-
tric attached to the end of the gripper arbor for the purpose of
withdrawing the points from the sheets, as applicable to the single [illegible]
as well as to the double cylinder Printing Machine.

[illegible] Newton.

Witnesses
Thos P. Jones
Ch. L. Fleischmann Jr

[illegible] 2073